(12) United States Patent
Woodcock

(10) Patent No.: US 9,112,667 B1
(45) Date of Patent: Aug. 18, 2015

(54) GEOLOCATION

(76) Inventor: William Woodcock, San Francisco, CA (US)

(*) Notice: Subject to any disclaimer, the term of this patent is extended or adjusted under 35 U.S.C. 154(b) by 417 days.

(21) Appl. No.: 12/873,272

(22) Filed: Aug. 31, 2010

(51) Int. Cl.
*H04L 5/00* (2006.01)

(52) U.S. Cl.
CPC .................................. *H04L 5/0069* (2013.01)

(58) Field of Classification Search
CPC ............................. H04L 5/0069; H04W 72/04
USPC ........... 709/220, 223, 224, 238; 342/357, 457
See application file for complete search history.

(56) References Cited

U.S. PATENT DOCUMENTS

| | | | | |
|---|---|---|---|---|
| 6,243,746 B1 * | 6/2001 | Sondur et al. | ................ | 709/220 |
| 6,671,514 B1 * | 12/2003 | Cedervall et al. | .......... | 455/456.1 |
| 6,684,250 B2 * | 1/2004 | Anderson et al. | ............. | 709/225 |
| 6,947,978 B2 * | 9/2005 | Huffman et al. | .............. | 709/220 |
| 7,039,689 B2 * | 5/2006 | Martija et al. | ................ | 709/220 |
| 7,072,963 B2 * | 7/2006 | Anderson et al. | ............. | 709/225 |
| 7,454,523 B2 * | 11/2008 | Chow et al. | .................... | 709/245 |
| 7,472,172 B2 * | 12/2008 | Anderson et al. | ............. | 709/219 |
| 7,543,045 B1 * | 6/2009 | Agrawal et al. | .............. | 709/220 |
| 7,594,605 B2 * | 9/2009 | Aaron et al. | ................... | 235/380 |
| 7,685,279 B2 * | 3/2010 | Miltonberger et al. | ....... | 709/225 |
| 7,747,645 B2 * | 6/2010 | Wahl | .............................. | 707/783 |
| 7,809,857 B2 * | 10/2010 | Anderson et al. | ............. | 709/245 |
| 7,945,709 B2 * | 5/2011 | Cain et al. | ........................ | 710/15 |
| 7,983,691 B1 * | 7/2011 | Wong et al. | ................. | 455/456.1 |
| 8,018,973 B2 * | 9/2011 | Ryu et al. | ....................... | 370/508 |
| 8,055,792 B2 * | 11/2011 | Winkler et al. | ............... | 709/240 |
| 8,135,413 B2 * | 3/2012 | Dupray | ....................... | 455/456.1 |
| 8,193,981 B1 * | 6/2012 | Hwang et al. | ............ | 342/357.63 |
| 8,204,982 B2 * | 6/2012 | Casado et al. | ................ | 709/224 |
| 8,239,510 B2 * | 8/2012 | Houri | ............................. | 709/223 |
| 8,243,730 B1 * | 8/2012 | Wong et al. | .................... | 370/389 |
| 8,879,564 B2 * | 11/2014 | Ryu et al. | ....................... | 370/400 |
| 2002/0016831 A1 * | 2/2002 | Peled et al. | .................... | 709/219 |
| 2002/0087666 A1 * | 7/2002 | Huffman et al. | .............. | 709/220 |
| 2003/0074471 A1 * | 4/2003 | Anderson et al. | ............. | 709/245 |
| 2004/0068582 A1 * | 4/2004 | Anderson et al. | ............. | 709/245 |
| 2004/0078367 A1 * | 4/2004 | Anderson et al. | ................ | 707/3 |
| 2004/0078489 A1 * | 4/2004 | Anderson et al. | ............. | 709/245 |
| 2004/0078490 A1 * | 4/2004 | Anderson et al. | ............. | 709/245 |
| 2004/0203851 A1 * | 10/2004 | Vetro et al. | ................. | 455/456.1 |

(Continued)

OTHER PUBLICATIONS

Laki, Sándor, et al. "A model based approach for improving router geolocation."Computer Networks 54.9 (2010): 1490-1501.*

(Continued)

*Primary Examiner* — Jimmy H Tran
(74) *Attorney, Agent, or Firm* — O'Connell Law Firm; Thomas P. O'Connell

(57) ABSTRACT

Current or past physical location of a target device in a communication network, including: (included and excluded) points, surfaces, regions, point- and integrated-probabilities, nearest-(physical)-neighbors, whether the device is properly integrated, and otherwise, and combinations or conjunctions thereof. Countermeasures exist for those targets which are uncooperative with geolocation. Multiple measurements provide a statistical basis for establishing a probability density function, which may be augmented or refined using domain information, intermediate routing pathways, or overlap of multiple such probability density function. Alternatively, a geolocation may be provided by a formula or a table reference, in response to a measured flight-time, a probability, and possibly other network routing parameters, such as hop count.

28 Claims, 3 Drawing Sheets

(56) References Cited

U.S. PATENT DOCUMENTS

2004/0203866 A1* 10/2004 Sahinoglu et al. ......... 455/456.1
2006/0010252 A1*  1/2006 Miltonberger et al. ....... 709/245
2007/0287473 A1* 12/2007 Dupray ...................... 455/456.1
2008/0275978 A1* 11/2008 Houri ........................... 709/223

OTHER PUBLICATIONS

Yi, Xu, et al. "An approach to evaluate network performance based on hop-by-hop latencies." Broadband Network & Multimedia Technology, 2009. IC-BNMT'09. 2nd IEEE International Conference on. IEEE, 2009.*

* cited by examiner

GEOLOCATION

BACKGROUND

In a network of communicating devices, such as for example the Internet, or a communication network coupled thereto (such as for example an enterprise network, a wireless communication system, or any other type of computer network or communication system), the devices are each generally identified by a substantially unique name, such as for example the 4-octet address associated with devices by the IP (Internet Protocol) protocol (version 4), and any variants thereof. These substantially unique names are generally used by routing or switching devices within the network to direct messages (using either circuit-based or packet-based techniques) from their sources to their destinations.

The routing and switching devices, or at least the subnet thereof (sometimes referred to herein as "the network"), are at least collectively aware of the network topology (which devices are coupled to which other devices) and the network topography (which connections between devices are relatively fast or slow, reliable or not, or exhibit other features relevant to network communication, such as for example a measure of quality of service, sometimes called "QoS"). While this information is generally available throughout the network for communication purposes, the physical locations of devices coupled to the network or using it for communication are not so freely available. Identifying physical location in response to network address information—and possibly other information, such as metadata about the communicating device or its users' habits and practices—is sometimes called "geolocation", it is also sometimes called "IP geolocation", or other terms or phrases.

Relatively precise and reliable geolocation might be desired for a device coupled to such a network for a variety of reasons, such as one or more of the following:

- directing advertisements or other communications to recipients in selected geographic regions, sometimes referred to herein as "geotargeting", "IP geotargeting", or other terms or phrases;
- determining a most probable set of locations for that device, such as to locate lost nodes or to rule out locations for lost nodes, such as in a search-and-rescue environment in a wireless environment distributed over a relatively large region, or to locate rogue nodes or to rule out locations for rogue nodes, such as in a hostile electromagnetic environment as one might find due to criminal, espionage, or military activity;
- determining an external boundary of a region or area within which that device, according to received data, must necessarily be located, such as in a search-and-rescue environment or a law enforcement environment, or similarly, providing sufficient evidence or proof that a designated device was or was not located within a designated region, or at a specific location, within a designated time period, such as in a legal proof environment or a network trouble-shooting environment;
- locating failed nodes and communication paths within such a network, or at least locating a most probable set of such failed nodes and communication paths within such a network, such as in an environment in which nodes cannot be found for communication or such as in an environment in which communication with nodes is uncertain; and
- identifying, with at least some degree of specificity, a physical, geographic path through which a designated set of messages flow through that network, such as in an environment in which the physical location of network traffic is deemed important, such as a network troubleshooting environment, a search-and-rescue environment (particularly if communication with one or more rescue workers is lost or unreliable), or such as when communicating nodes in the network are moving, such as in an environment in which tracking the location of such nodes from time to time is desired, such as an air-traffic control or fleet management environment.

Known methods include determining the physical location of a device in a computer network using triangulation on the surface of a sphere (approximately the shape of the Earth), in response to communication delay to-and-from the device from three or more known locations. See, for example, U.S. Pat. No. 6,947,978 B2. While these known methods can generally achieve their purpose of providing approximate physical locations of such devices, they are generally only able to designate an area of the Earth's surface as the possible locations of the device. These approximate physical locations have a margin of error which is often higher than desirable, and often provide insufficient accuracy, for many purposes. The granularity of these measurements is often higher than desirable, given the relatively rapid propagation of signals within the network, with the result that precision of measurement is extremely difficult to obtain. Often the location of the device can only be determined to within an area of several thousand square miles. This is often deemed inadequate for many uses of geolocation described herein. Moreover, these measurements serve only to designate a possible region for the geolocated element; they do not provide any substantial information about probability of location within that possible region.

Known methods include using statements by third parties about the location of the device. For example, the Internet "Whois" record for the domain name associated with the device shows a postal address for the party that administers the subnet where that device is found. See, for example, U.S. Pat. No. 6,684,250 B2. While these known methods can generally achieve their purpose of providing better physical locations of such devices than pure triangulation, they are subject to several drawbacks: (1) the Whois record shows a postal address for an administrator, which is no guarantee of the location of the actual device itself; (2) Whois records might be inaccurate or even deliberately false; (3) Whois records are often deemed inadequate information or insufficiently certain to provide useful geolocation information, e.g., for police or detective work, or for evidence in court. These problems appear inherent to information supplied about the device from a third party, or provided voluntarily, or provided by a human being, rather than directly obtained from interaction with the device, and are not specific to "Whois" records.

Known methods include determining a matrix of minimum communication times between (1) a set of multiple network stations, and (2) a set of endpoint nodes. Both the former and the latter are at known locations. A vector of communication times from the network stations to the target device is measured, and the target device is presumed to be at the same location as the endpoint whose vector of communication times (from the network stations) most closely matches the measured vector. See, for example, U.S. Pat. No. 6,947,978 B2. While these known methods can generally achieve their purpose of providing better physical locations of such devices than pure triangulation, they are subject to the drawback that an amount of communication effort diverted to geolocation is relatively large. Neither network traffic to the target device nor network traffic overall are minimized, with the effect that both the target device is burdened by the effort, and with the effect that geolocation efforts become relatively more difficult with network size.

Moreover, obtaining a vector of such communication times involves measuring one or more distances to endpoint nodes which are at known locations. It sometimes occurs that such known locations are not as prevalent as desirable. It often occurs that such known locations are not conveniently located, or even located anywhere reasonably near the target device, either locality within the connectivity of the network or locality within physical space. Preparing a set of such known locations ahead of time involves significant network communication, as well as effort and time, and has a substantial chance of failing to find enough such known locations ahead of time for a target location that is unknown ahead of time.

Known methods generally suffer from the drawbacks that they do not significantly address questions regarding the network topology or network topography, such as, whether the network has adequate connectivity, whether the network topology or network topography have changed significantly over time, what the communication limits are of the network, and other information related to trouble-shooting the subnet of communication and routing devices for the network. Moreover, known methods generally suffer from the drawbacks that they do not generally provide any convenient method for assigning priority to one or more determined locations or determined regions. For example, known methods generally provide only a set of points or regions where the geolocated target device might be found, without relative probability of one or more of those points, or one or more subsets of those regions, being factually accurate or useful for the purpose for which geolocation was used.

Some, not necessarily all, methods are described in the following documents:

U.S. Pat. No. 6,684,250 B2, issued Jan. 27, 2004, in the name of inventors Anderson, et al., titled "Method and apparatus for estimating a geographic location of a networked entity", believed to be assigned to Quova, Inc., of Mountain View, Calif.; and U.S. Pat. No. 6,947,978 B2, issued Sep. 20, 2005, in the name of inventors Huffman, et al., titled "Method for geolocating logical network addresses", assigned to the United States, as represented by the Director, National Security Agency.

Readers are encouraged and exhorted to make their own evaluation of known methods.

SUMMARY OF THE DESCRIPTION

This description includes techniques, including methods, physical articles, and systems, which provide information about (current or past) physical location of a target device (sometimes herein called a "target" or a "target node") in a communication network. Such information about physical location might express one or more of the following, or some combination or conjunction thereof:

where the target device currently is, or was at specified times;

an area of a surface or a region in a space which provides a best estimate of the target device's location;

an area of a surface or a region in a space which provides a guarantee of the target device's location—or equivalently, a guarantee of where the target device cannot be found, or could not have been found at specified past times;

a probability mass distribution of relative likelihoods, for example and without limitation, of particular points, areas, or regions for the target device;

a set of (physically) nearest-neighbor nodes in the communication network, or in a related communication network;

a likelihood that a target node at a known location is a rogue node, or otherwise improperly integrated into the network (such as for example, if the target node can be geolocated with high probability one or more locations, or one or more regions, under hostile control, or where legitimate nodes are otherwise unlikely to be); or other information about or related to physical location, for example and without limitation, velocity, orientation, or otherwise.

After reading this application, those skilled in the art would recognize that combinations or conjunctions of such information might include, for example and without limitation, a probabilistic distribution expressed for point locations, an integral of such a probabilistic distribution of point locations in an area or region, a probabilistic distribution of nearest-neighbor nodes, and the like. As there are a number of possible types of such information described above, there are a corresponding number of possible combinations or conjunctions thereof.

Although this description is primarily directed to techniques relating to location on or near the surface of the Earth, in the context of the invention, there is no particular reason for any such limitation. Thus, the prefix "geo-" in "geolocation", and other terms, need not refer to the surface of the Earth. The same techniques described herein might be used, for example and without limitation, on other planetary bodies (in which case they might be called "lunalocation", "lunarlocation", or some other appropriate term), in substantially 3-dimensional environments (such as underwater, in broken terrain, in the air, in Earth orbit or more distant), otherwise, or some combination or conjunction thereof. Similarly, the identifier "IP" in "IP geolocation", and other terms, need not refer to use of the Internet Protocol, or variants thereof, or even to electromagnetic forms of communication. The same techniques described herein might be used, for example and without limitation, with other communication techniques and protocols; after reading this application, many such possibilities would be clear to those skilled in the art.

Probabilistic Sampling.

An effort devoted to determining geolocation might be relatively increased or decreased, for example and without limitation, making multiple measurements $m_{1 \ldots j}$ where a single measurement m is otherwise described or called-for. When measuring delays $dt_{1 \ldots j}$ to the target node, the value of a lowest such observed delay $dt_{low}$ has the effect of describing a maximum possible distance $ds_{max}$ of the target node from a probe location, as otherwise the signal from the probe location to the target node, and back, would imply that a maximum possible communication speed of the network was exceeded.

Absent substantial violation of Einstein's theories of relativity, that possible communication speed is necessarily less than the vacuum speed of light, c. In some environments the maximum possible communication speed might be substantially less. For a $1^{st}$ set of examples and without limitation, a communication speed of electrical signals in conductive wiring, such as copper, or wireless electromagnetic signals in a noisy atmospheric environment, or a communication speed of optical signals in optical fiber (or other optically transmissive media), is often substantially less than the vacuum speed of light. (As noted below, a communication speed of optical signals in optical fiber is often only about ⅔ c.) For a 2nd set of examples and without limitation, a communication speed of sonar signals in sonar systems is generally less than or equal to a speed of sound in the relevant medium. While precision of speed is generally valuable for accurate measurement of distance, in some embodiments it might be valuable to use a slower form of communication, with the effect of obtaining better precision of location for relatively short time delays.

A statistically-significant sampling of possible such values would allow inference of a corresponding probabilistic measure of that distance. For example and without limitation, the probabilistic measure of that distance might be expressed as a log-normal distribution with a mean and variance equal to the best estimate derived from the set of such multiple data. (Other and further distributions of probabilistic measure, such as for example a logistic distribution, are also workable, and are within the scope and spirit of the invention.) This has the effect of allowing a geolocation system to conclude (1) a maximum possible distance, (2) a most likely distance, and (3) a probabilistic distribution of most likely distances, with that probabilistic distribution having a value of substantially zero probability at locations beyond the maximum possible distance. After reading this application, those skilled in the art will recognize that in cases in which the maximum possible distance $ds_{max}$ restricts the possible location of the target node, a set of such maximum possible distances $ds_{1\ldots j}$ from distinct probe locations $s_{1\ldots j}$ has the effect of allowing a geolocation system to deduce a substantially smaller possible area or region for the target node, as the actual location must satisfy all such maximum possible distances $s_{max,1\ldots j}$.

Although this description is primarily directed to techniques in which such multiple measurements are made from more than one such probe device, in the context of the invention, there is no particular reason for any such limitation. The same techniques described herein might be used, for example and without limitation, using a single such probe device at multiple places or times, using a single such probe device using multiple pathways to the target device, using signals having multiple distinct propagation techniques, or even using a single probe at a single place and time. (While the latter would generally provide a substantially donut-shaped probability distribution, this is considered superior to lack of a known probability distribution.) Similarly, the canonical or typical statistical distribution of distance from a probe device to a target device need not be log-normal. It might exhibit significant skew or excess kurtosis, or might exhibit a distinct distribution, such as for example an ordinary Gaussian distribution, or a logistic distribution. After reading this application, those skilled in the art would recognize that empirical evidence might lead a geolocation system to conclude that the statistical distribution should be modeled as other than log-normal; many such possibilities would be clear to those skilled in the art.

Domain Information.

A set of information relating to a likelihood of the target node being in a specified location, area, or region, can be used (either independently or) to modify the probabilistic conclusion drawn as described above.

For example, a proxy for likelihood of the target node being in a specified location, area, or region might include one or more of the following, or some combination or conjunction thereof:
- a set of data describing or allowing inference of population density, for example and without limitation, census data indicating an amount of population in each area, data indicating a number of businesses or families identified in a phone directory or other indicator of location, data indicating a frequency or number of citations of location or place name in a database of businesses or persons (such as for example those found in alumni listings from universities, those found in social networking sites, subscribers to databases available using a communication network, subscribers to mailing lists or syndication feeds, and otherwise);
- a set of data describing or allowing inference of power usage, for example and without limitation, measures of economic development, measures of visible luminescence at night (night-time light emission), or measures of other luminescence during either day or night (such as for example infrared emission, such as might occur from waste heat, from electrical or heat co-generation systems, or other heat generation);
- a set of data describing or allowing inference of building development, such as for example a measure of building height above a mean ground level or other relevant mean level, a measure of building concentration (such as for example a measure of land usage devoted to industrial or commercial use, versus residential or farm use), a measure of industrial development (such as for example a measure of pollutants from stationary sources), a measure of road development, a measure of traffic volume (such as for example a measure of air pollutants from mobile sources);
- a set of data describing or allowing inference of communication bandwidth, or other communication capability, for example and without limitation, distance from a cellular base station, density of cellular base stations in a specified neighborhood, a measure of a number of computing devices known to be located in or near a region (such as for example a number of computers sold in that region, a number of mobile handsets, "netbooks", or other devices sold in that region), a measure of network requests originating from that region (such as for example HTTP requests), or otherwise; or
- other information about or related to likelihood of the target device being in (or having been in) a specified location, area, or region.

After reading this application, those skilled in the art would recognize that combinations or conjunctions of such information might include, for example and without limitation, a probabilistic distribution expressed for point locations, an integral of such a probabilistic distribution of point locations in an area or region, a probabilistic distribution of nearest-neighbor nodes, and the like. As there are a number of possible types of such information described above, there are a corresponding number of possible combinations or conjunctions thereof.

Intermediate Routing Points.

A set of information relating to a route traced by a geolocation message (such as for example, a Ping request packet) can be used to more precisely determine the likelihood of the target node being in a specified location, area, or region. This information can be used (either independently or) to modify the probabilistic conclusion drawn as described above.

For some examples, and without limitation:
- between the sender S and the receiver R of a geolocation signal, being able to identify a medial node M, and having the actual (or approximate) location of the medial node M, allows a geolocation system to determine a distance to the receiver R as if it were originated at the medial node M, such as for example by subtracting a known distance S–M from the measured distance S–R;

on distinct paths taken by a geolocation signal between the sender S and the receiver R, being able to identify more than one such medial node $M_{1...j}$ (at least one per path), allows a geolocation system to determine a distance to the receiver R as if it were originated at each of the medial nodes $M_{1...j}$; or once a more precise determination of the geolocation of the target node is determined, a process of finding one or more such medial nodes $M_{1...j}$ can be repeated, and the location of the target node determined more precisely with each iteration of the process.

After reading this application, those skilled in the art would recognize that combinations or conjunctions of such information might include, for example and without limitation, determining a restricted range from one medial node M; determining a probabilistic distribution from one or more such medial nodes M; or determining an intersection or probabilistic distribution given combined information from more than one such medial node $M_{1...j}$.

While this application describes cases in which there one medial node M for each distinct path from the sender S to the receiver R, in the context of the invention, there is no particular need for any such limitation. For example and without limitation, it might be possible to determine a location (or an approximate location) of either some of the medial nodes $M_{1...j}$ or the receiver S, in response to knowledge of the network topology, or in response to distances (known or approximate) between pairs of the medial nodes $M_{i,j}$ (preferably when such pairs include two medial nodes $M_i$ and $M_j$ on distinct paths or subpaths to the receiver).

Probabilistic Geolocation.

As described above, a set of information relating to a probabilistic conclusion as described above can be determined, either in response to probabilistic sampling, or in response to domain information, or both. A probabilistic distribution can be estimated for a combination of parameters, some of which might be non-spatial (and some of which might be spatial). For some examples, and without limitation:

a probabilistic distribution might be estimated in response to (1) the actual location of a particular target spot, (2) a distance from a probe device to that particular target spot, (3) an observed time delay, and (4) a hop count for a path taken between the sender S and the receiver R of the geolocation signal;

a probabilistic distribution might be estimated in response to (1) a set or subset of possible spatial dimensions, such as for example, latitude, longitude, and height above the Earth's surface, (2) a set or subset of non-spatial dimensions, such as hop count as noted above, flight time versus switching time, precision of the estimated location of the sender S, precision of the estimated location of the receiver R, or other factors.

Countermeasures Against Uncooperative Devices.

Although this description is primarily directed to cases in which the target device is willing and able to cooperate with the geolocation system, in the context of the invention, there is no particular reason for any such limitation. For example and without limitation, if the target refuses to respond to geolocation signals from the probe, or if the target responds in such way that geolocation would be misdetermined, the probe might take countermeasures to obviate problems introduced by uncooperative targets. For some examples, and without limitation:

If the target refuses to respond, or is prevented from responding by a firewall device or another cause, to a $1^{st}$ type of geolocation signal, the probe might attempt to coax a response from the target using a $2^{nd}$ type of geolocation signal. For example, and without limitation, the probe might use a $1^{st}$ type of geolocation signal including a Ping request. If the target does not respond to a Ping request, the probe might use a $2^{nd}$ type of geolocation signal including an unsolicited HTTP reply (not request). Likely, the any firewall will allow this $2^{nd}$ type of geolocation signal to reach the target, which will make an error response.

If the target does not respond to a $2^{nd}$ type of geolocation signal including an unsolicited HTTP reply, the probe might attempt to reach the target with a $3^{rd}$ type of geolocation signal, a $4^{th}$ type of geolocation signal, and the like.

If the target does not respond to any geolocation signal from the probe, the probe might attempt to geolocate a firewall protecting the target, in response to an assumption that the firewall is operated by the same entity as the target, and is substantially co-located with the target. While geolocation of the firewall might not provide an exact location for the target, the firewall's location might serve as a sufficient proxy for the target's location.

Similarly, if the firewall refuses to respond, or is prevented from responding by a security policy or another cause, the probe might attempt to coax a response from the firewall, similarly to coaxing a response from the target. If the firewall does not respond to any geolocation signal from the probe, the probe might attempt to geolocate a nearest-neighbor in the communication network, an identifiable router near the firewall, or use some other proxy for the target's or the firewall's location.

Combinations and Conjunctions of Multiple Methods.

Although this description is primarily directed to each technique described above individually, in the context of the invention, there is no particular reason for any such limitation. Rather, multiple ones of these techniques can be combined or otherwise used, such as using a $1^{st}$ technique, and using a $2^{nd}$ technique to modify results derived from the $1^{st}$ technique, or using a combination of the $1^{st}$ technique and the $2^{nd}$ technique to each inform an estimate to be drawn in response to the other.

DESCRIPTION

Generality of the Description

Figure 1:
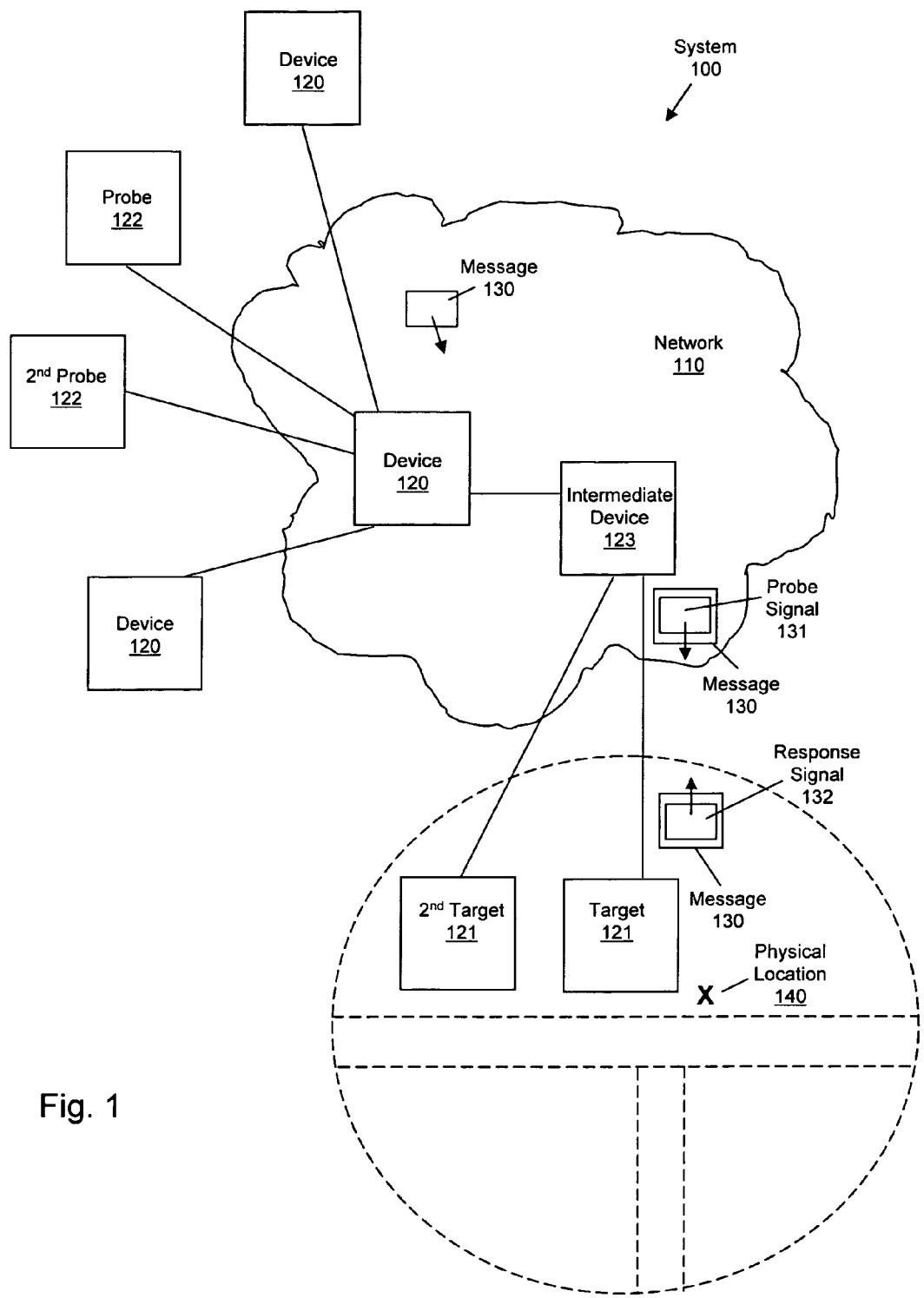
FIG. 1 is a schematic depiction of a geolocation system according to the invention.

This application should be read in the most general possible form. This includes, without limitation, the following:

References to contemplated causes and effects for some implementations do not preclude other causes or effects that might occur in other implementations.

References to particular reasons or to particular techniques do not preclude other reasons or techniques, even if completely contrary, where circumstances would indicate that the stated reasons or techniques are not as applicable.

References to "preferred" techniques generally mean that the inventors contemplate using those techniques, and think they are best for the intended application. This does not exclude other techniques for the invention, and does not mean that those techniques are necessarily essential or would be preferred in all circumstances.

References to specific techniques include alternative and more general techniques, especially when discussing aspects of the invention, or how the invention might be made or used.

Generality of the Techniques

Technologies shown or suggested by this description should also be thought of in their most general possible form. This includes, without limitation, the following:

The terms "constantly", "continually", "from time to time", "occasionally", "periodically" (and similar terms and phrases) generally indicate any case in which a method or technique, or an apparatus or system, operates over a duration of time, including without limitation any case in which that operation occurs only part of that duration of time. For example and without limitation, these terms would include, without limitation, methods which review a status as frequently as feasible, on a periodic schedule such as once per second or once per day, in response to an alarm or trigger such as a value reaching a threshold, in response to a request or an implication of a request, in response to operator intervention, otherwise, and to combinations and conjunctions thereof.

The terms "distribution", "likelihood", "probabilistic distribution", "probability", "probability density function", "probability mass function", "pseudo-probability" (and similar terms and phrases) generally indicate any information describing a relative degree of prevalence, propensity, or statistical aspect, and are intended to cover the whole range of concepts sometimes indicated by those terms and phrases. In the context of the invention, concepts such as probability need not be continuous or discrete, need not be restricted to values between 0 and 1, need not obey mathematical rules sometimes ascribed to probability, and need not indicate a random, statistical, or stochastic process of any kind, and might represent a pseudo-probability or other proxy for likelihood.

The terms "effect", "with the effect of" (and similar terms and phrases) generally indicate any natural and probable consequence, whether or not assured, of a stated arrangement, cause, method, or technique, without any implication that an effect or a connection between cause and effect are intentional or purposive.

The terms "methods, physical articles, and systems", "techniques" (and similar terms and phrases) generally indicate any material suitable for description, including without limitation all such material within the scope of patentable subject matter, or having ever been considered within the scope of patentable subject matter, or which might colorably be within the scope of patentable subject matter, notwithstanding most recent precedent.

The terms "pseudo-random", "random" (and similar terms and phrases) generally indicate any technique of any kind, in which information is generated or selected in a manner not predictable to the recipient. In the context of the invention, data, information, numbers, processes, or otherwise, referred to herein as "random", need not be equidistributed over anything in particular.

The term "relatively" (and similar terms and phrases) generally indicates any relationship in which a comparison is possible, including without limitation "relatively less", "relatively more", and the like. In the context of the invention, where a measure or value is indicated to have a relationship "relatively", that relationship need not be precise, need not be well-defined, need not be by comparison with any particular or specific other measure or value. For example and without limitation, in cases in which a measure or value is "relatively increased" or "relatively more", that comparison need not be with respect to any known measure or value, but might be with respect to a measure or value held by that measurement or value at another place or time.

The term "substantially" (and similar terms and phrases) generally indicates any case or circumstance in which a determination, measure, value, or otherwise, is equal, equivalent, nearly equal, nearly equivalent, or approximately, what the measure or value is recited. The terms "substantially all" and "substantially none" (and similar terms and phrases) generally indicate any case or circumstance in which all but a relatively minor amount or number (for "substantially all") or none but a relatively minor amount or number (for "substantially none") have the stated property. The terms "substantial effect" (and similar terms and phrases) generally indicate any case or circumstance in which an effect might be detected or determined.

The terms "this application", "this description" (and similar terms and phrases) generally indicate any material shown or suggested by any portions of this application, individually or collectively, including all documents incorporated by reference or to which a claim of priority can be made or is made, and include all reasonable conclusions that might be drawn by those skilled in the art when this application is reviewed, even if those conclusions would not have been apparent at the time this application is originally filed.

The invention is not in any way limited to the specifics of any particular examples disclosed herein. After reading this application, many other variations are possible which remain within the content, scope and spirit of the invention; these variations would be clear to those skilled in the art, without undue experiment or new invention.

Real-World Nature

The invention includes techniques, including methods, physical articles, and systems, that receive real-world information dictated by real-world conditions (not mere inputs to a problem-solving technique). The techniques provided by the invention are transformative of the information received, at least in the sense that incoming timing data is collected and an estimated geolocation is provided in response thereto. This has the effect that a $1^{st}$ type of information (such as for example, timing data) is transformed into a $2^{nd}$ type of information (such as for example, location data).

The invention includes techniques that are tied to a particular machine, at least in the sense that particular types of communication and computation, by particular types of devices, are performed in a communication network. While this description is primarily directed to that portion of the invention in which timing data is collected from routers and switches in a computer network, there is no particular requirement for any such limitation. For example and without limitation, the techniques described herein might be applied to QoS data (as measured between a sender S and a receiver R, to clarify or help determine one or more medial nodes M through which the geolocation signals are routed.

This description includes a preferred embodiment of the invention with preferred process steps and data structures. Those skilled in the art would recognize after perusal of this application that embodiments of the invention can be implemented using general purpose switching processors or special purpose switching processors or other circuits adapted to particular process steps and data structures described herein, and that implementation of the process steps and data structures described herein would not require undue experimentation or further invention.

DEFINITIONS

The following definitions are exemplary, and not intended to be limiting in any way:

The terms "communication network", "network" (and similar terms and phrases) generally indicate any set of devices operating with the effect of cooperating to couple information from one or more senders to one or more recipients, the set of senders and the set of recipients being free to overlap. In the context of the invention, a communication network need not be uniform or even compatible across the network in techniques used to send or receive information, need not be physically compact, connected, or continuous, might be dynamic, static, or otherwise, and need not indicate any particular intentional design.

The terms "device", "node" (and similar terms and phrases) generally indicate a device of any kind, capable of performing either the particular communicating tasks or the particular computing tasks, or variants thereof, or maintaining the particular data structures, or variants thereof, as described herein. A device might include one or more general-purpose processors having access to data structures or program instructions with the effect of performing the communicating tasks, performing the computing tasks, or maintaining the data structures, as described herein, might alternatively or in addition include one or more special-purpose processors, and might alternatively or in addition include electronic circuitry or other particular or special-purpose hardware built to perform those functions, or some combination or conjunction thereof.

The terms "geolocation", "geotargeting", "IP geolocation", "IP geotargeting" (and similar terms and phrases) generally indicate any technique of any kind, in which information sufficient to describe or identify a physical location of a device coupled to a communication network is deduced, determined, generated or otherwise uncovered.

The terms "geolocation system", "geotargeting system", "IP geolocation system", "IP geotargeting system" (and similar terms and phrases) generally indicate any technique of any kind, including without limitation any device, machine, method, process, or otherwise, in which at least some information useful for geolocation is produced or used.

The terms "location", "position" (and similar terms and phrases) generally indicate information sufficient to describe or identify a physical location or position in the real world, might describe or identify other information about or related to physical location, for example and without limitation, velocity, orientation, or otherwise, and need not include information sufficient to describe or identify a conceptual, logical or topological or graph-theory position, such as connectivity associated with a node in a computer network, unless otherwise indicated.

The terms "message", "packet", "signal" (and similar terms and phrases) generally indicate any encoding, propagation, or transmittal of any kind of information, capable of being sent from a device of any kind and received by one or more devices. A message might be analog or digital, might be encoded using any selected technique for impressing information, and need not be restricted to electromagnetic phenomena.

The terms "probe" and "target" (and similar terms and phrases) generally refer to a relationship between devices or applications, not necessarily to a physical or logical division of capability or function. One "probe" or one "target" might comprise any one or more of the following: (a) a single physical device capable of executing software; (b) a portion of a physical device, such as a software process or set of software processes capable of executing on one hardware device; or (c) a plurality of physical devices, or portions thereof, capable of cooperating to form a logical entity. An element that is a probe for a $1^{st}$ purpose or at a $1^{st}$ time might be a target for a $2^{nd}$ purpose or at a $2^{nd}$ time.

The terms "proxy", "substitute" (and similar terms and phrases) generally refer to any case or circumstance in which a $1^{st}$ value might be used in place of, as a substitute for, or as an approximate or substantial measure of, of what is recited to be a proxy. For example and without limitation, to say that population density might be used as a proxy for network device density has the implication that use of population density in at least some circumstances, at least some of the time, would serve as a value as good as, or nearly as good as, network device density, for at least one or more purposes.

After reading this application, those skilled in the art would recognize that these definitions would be applicable to techniques, methods, physical elements, and systems—not currently known, or not currently known to be applicable by the techniques described herein—including extensions thereof that would be inferred by those skilled in the art after reading this application, even if not obvious to those of ordinary skill in the art before reading this application.

Notations

The following notations, forms, and symbols, are also exemplary, and not intended to be limiting in any way:

An otherwise-unspecified measurement may generally be represented with a term m. A set of multiple measurements may generally be represented with a subscripted term $m_{1 \ldots j}$, where the ellipses generally indicate a range of values. Unless otherwise specified, a set of multiple values of any time may generally be represented with a subscripted term $x_{1 \ldots j}$, where the ellipses generally indicate a range of values.

A time value may generally be represented with a term t. A set of multiple such time values may generally be represented with a subscripted term $t_{1 \ldots j}$. In such cases, a "time value" generally indicates an actual time, as measured in a particular physical reference frame, such as for example 9:01 a.m.

A time delay may generally be represented with a term dt. A set of multiple such time values may generally be represented with a subscripted term $dt_{1 \ldots j}$. In such cases, a "time delay" generally indicates a duration of time, as measured in a particular physical reference frame, such as for example 100 milliseconds.

A spatial position may generally be represented with a term s. A set of multiple such positions may generally be represented with a subscripted term $s_{1 \ldots j}$. In such cases, a "position" generally indicates an actual location, as measured in a particular physical reference frame, such as for example the corner of Wall Street and $5^{th}$ Avenue in New York City. A spatial position may also be represented with a term <<x,y>>, where x and y represent coordinates, such as for example a latitude and longitude.

A spatial distance may generally be represented with a term ds. A set of multiple such distances may generally be represented with a subscripted term $ds_{1...j}$. In such cases, a "distance" generally indicates a physical separation between a $1^{st}$ location and $2^{nd}$ location, as measured in a particular physical reference frame, such as for example 1,001 meters.

A speed or velocity may generally be represented with a term v. A set of multiple such speeds or velocities may generally be represented with a subscripted term $v_{1...j}$. In such cases, a "speed" generally indicates a measurement having units of distance/duration, as measured in a particular physical reference frame, such as for example c, the vacuum speed of light.

A message sender may generally be represented with a term S, or a subscripted term $S_i$. A pair of such message senders may also be represented with a subscripted term $S_{i,j}$. A message receiver may generally be represented with a term R, or a subscripted term $R_i$. A pair of such message receivers may also be represented with a subscripted term $R_{i,j}$. A medial node between a message sender S and a message receiver R may generally be represented with a term M, or a subscripted term $M_i$. A pair of such medial nodes may also be represented with a subscripted term $M_{i,j}$.

A probability may generally be represented with an operator prob(•). A probability density function may also be represented with an operator pdf(•).

After reading this application, those skilled in the art would recognize that these notations would be applicable to techniques, methods, physical elements, and systems —not currently known, or not currently known to be applicable by the techniques described herein—including extensions thereof that would be inferred by those skilled in the art after reading this application, even if not obvious to those of ordinary skill in the art before reading this application.

FIGURES AND TEXT

Where described as shown in a figure, an element might include
- other items shown in the figure in addition to, or operating in combination or conjunction with, that particular element (or that particular element in combination or conjunction with other elements, whether shown or not shown in the figure, and whether described or not described with respect to the figure).
- other items not shown in the figure, but whose inclusion would be known to those skilled in the art, or which would be known after reasonable investigation, without further invention or undue experimentation.
- subparts of that element, whether shown or not shown in the figure, which might be convenient for operation of the element, but which are not necessarily required in the described context, or which might be necessary for operation of the element in the described context, but which are not necessary for description at a level understandable to those skilled in the art.

FIG. 1

FIG. 1 shows a conceptual drawing of a system 100, including elements shown in the figure, including at least a network 110, one or more devices 120 coupled to that network 110, one or more messages 130 sent from or received by one or more of those devices 120, and one or more physical locations 140 where devices 120 might be disposed, whether dynamically or statically.

One or more of those devices 120 includes a target 121, for which a physical location 140 might be determined with respect to a physical reference frame, and in response to information deduced, developed, or measured in response to the network 110. As described herein, the target 121 is generally capable of receiving, or at least receiving and the time of its receipt being determinable, a probe signal 131 included with a $1^{st}$ message 130 in that network 110, and providing a response signal 132 which might be included with a $2^{nd}$ message 130 in the network 110. As described herein, the response signal 132 is generally emitted without substantial delay from receipt of the probe signal 131, such as might occur when the probe signal 131 includes an ICMP "Ping" request and the response signal 132 includes a protocol response thereto.

While this description is primarily directed to response signals 132 which are provided without substantial delay, in the context of the invention, there is no particular reason for any such limitation. For a $1^{st}$ example, and without limitation, countermeasures as described herein might account for delay in returning the response signal 132, or even deliberate obfuscation thereof. For a $2^{nd}$ example, and without limitation, the system 100 might account for a known or predicted amount of processing delay associated with receiving the probe signal 131, parsing and recognizing it, determining a response thereto, and generating or providing the response signal 132.

One or more of those devices 120 includes a probe 122, for which a physical location 140 is generally known (but need not necessarily be known), for example and without limitation, a {latitude, longitude} pair. As noted herein, while this description is primarily directed to a 2D surface of the Earth, or a portion thereof, in the context of the invention, there is no particular reason for any such limitation. Also, while this description is primarily directed to a probe 122 whose physical location 140 is known, in the context of the invention, there is no particular reason for any such limitation. For example and without limitation, the physical location 140 of the probe 122 might be determined at another time or place, or the probe 122 might glean adequate information about the target 121 without knowing its own exact location.

The probe 122 generates or emits the geolocation signal 131, directed at least in part at the target 121, and having the effect that the target 121 responds with the response signal 132, which the probe 122 can recognize, and which the probe 122 can recognize the time delay between challenge and response. While this primarily directed to probe signals 131 and response signals 132 which are unicast and which are directed to specific devices, in the context of the invention, there is no particular reason for any such limitation. For a $1^{st}$ example and without limitation, the probe signals 131 might be multicast, with the probe 122 identifying one or more response signals 132 associated therewith, and preferably distinguishing among which particular targets 121 provided which particular response signals 132. For a $2^{nd}$ example and without limitation, the probe signals 131 might be speculative (at least in the sense that the probe 122 is not certain there actually is a target 121, or that the probe signal 131 will be received and responded to), with the effect that the probe 122 might determine information about the network 110 and about the target 121 using information which the probe 122 discovers by happenstance.

The probe 122 might be coupled directly to the target 121, or more usually, might be coupled to the target 121 using one or more intermediate nodes 123, such as for example routers, switches, gateways, or firewall devices.

Flight-Time Measurement

As described herein, the probe 122 might determine a sending time $t_{transmit}$ for the probe signal 131 and a receipt time $t_{receive}$ for the response signal 132. A difference $dt = t_{receive} - t_{transmit}$ between these two time values represents a delay, which delay includes at least processing-time delay $dt_{process}$ and a flight-time delay $dt_{flight}$, thus, $dt = dt_{process} + dt_{flight}$. While the processing-time delay $dt_{process}$ at the probe 122 can generally be determined with reasonable accuracy, this is not necessarily so for the processing-time delay $dt_{process}$ at the target 121.

Processing-time delay $dt_{process}$ at the target 121 must be between 0 and dt. In a substantially friendly environment, processing-time delay $dt_{process}$ at the target 121 might approximate processing-time delay $dt_{process}$ at the probe 122 (but not necessarily). As the total delay dt includes both the processing-time delay $dt_{process}$ and the flight-time delay $dt_{flight}$, the probe 122 can isolate the flight-time delay $dt_{flight}$ by subtracting: $dt_{flight} = dt - dt_{process,target} - dt_{process,probe}$. The flight speed $V_{flight}$ of the probe signal 131 and the response signal 132 is generally known (and is approximately ⅔ c for Internet message signals, where c is the vacuum speed of light), so the target 121 is within the distance $ds_{max} = dt_{flight} \cdot V_{flight}$ from the probe 122, at most.

More precise determinations involving distinct flight speeds $v_{flight}$ for the probe signal 131 and the response signal 132, or for distinct portions of the network no, or where processing-time delay $dt_{process}$ has determinable stochastic properties at either the target 121 or the probe 122, are possible, and are within the scope and spirit of the invention, even though they are not further described in detail at this point. In one embodiment, the number and processing delay(s) $dt_{process}$ (if any) of intermediate nodes 123 are known, with the effect that these processing delay(s) $dt_{process}$ are subtracted to determine the flight-time delay(s) $dt_{flight}$, thus $dt_{flight} = dt - dt_{process}$.

Probabilistic Sampling

As noted herein, the probe 122 might send a set of multiple probe messages 131 to the target 121, and receive a corresponding set of multiple response messages 132 from which it can measure a distinct delay dt incurred by each probe/response. Some of the delays dt might be substantially the same, but in general, the set of delays $dt_{1 \ldots j}$ should exhibit a statistical distribution, from which can be determined a least delay $dt_{min}$, an expected or mean delay $dt_\mu$, and a standard deviation of delay $dt_\sigma$. As described below, the statistical distribution of delays dt is presumed to be approximately log-normal, with a reasonably well-defined mode value near the mean delay $dt_\mu$, and a defined drop-off from the mode value, toward zero delay, and in another direction, toward infinite delay.

Since an actual zero delay should not be possible (although it might occur that after subtracting an estimated processing-time delay that the system 100 computes an actual negative flight-time delay, which would indicate that processing-time delay was overestimated), there should be an actual minimum possible flight-time delay $dt_{min}$, corresponding to a direct response over the communication medium without intermediaries, $-ds_{max} = dt_{min} \cdot v_{flight}$. With a sufficient number of measurements, the set of delays $dt_{1 \ldots j}$ will include a lowest value $dt_{low}$, which would asymptotically approach the minimum possible flight-time delay $dt_{min}$ as the number of those measurements is increased.

$$dt_{low} = \min(dt_{1 \ldots j})$$

$$\lim_{(n \to \infty)} dt_{low} = dt_{min}, \text{ or alternatively, } \lim_{(n \infty)} dt_{low} - dt_{min} = 0, \text{ where}$$

n is the number of measurements made, and $dt_{low}$ is the lowest observed value of those measurements, noting that increased measurement effort n provides a more accurate and precise estimate of $dt_{min}$, with the effect of providing a more accurate and precise estimate of distance $ds_{max}$.

The statistical distribution of measurements $dt_{1 \ldots j}$ provides a probabilistic expression of likely actual distance. For example and without limitation, if the statistical distribution is deemed log-normal (albeit possibly with substantial skew or excess kurtosis), a probability density function of distance might be derived.

$$\text{prob}_{(ds=x)} = \text{pdf}_{log-normal}(x, dt_\mu, dt_\sigma), \text{ and}$$
$$\text{prob}_{(ds<dsmin)} = 0,$$

the latter expressing the determination that the target 121 is no more than $ds_{max}$ distance from the probe 122. While this description is primarily directed to statistical distributions which are log-normal, or substantially so (such as for example ordinarily Gaussian or logistic), other statistical distributions are certainly possible, and in some cases might be preferable. In the context of the invention, there is no particular reason for any such limitation.

Network Traffic Variance

The system 100 might also perform timing measurements at distinct times (such as hour within a day, day within a week, on or near holidays) and under distinct conditions (light network traffic, heavy network traffic, bursty load on the network), with the effect that time delays other than flight time can be more accurately determined and removed from the measured delay.

This has the effect that processing-time delay, both at the target 121 and at the probe 122, can either be minimized, or can be determined with a smaller variance. With a more accurate or more precise measure of delays other than flight-time delay, the probe 122 can more accurately or more precisely remove those delays from the measured delay, leaving the flight-time delay itself.

More accurate or more precise measure of flight-time delay would correspond to more accurate statistical distributions (such as for example, more accurate measurement of $dt_\mu$, or tighter boundaries on $dt_\sigma$. This would have the effect of concentrating the probability mass in the probability density function determined for each probe 122. In cases in which there are multiple probes 122, this would also have the effect of concentrating the probability mass in the combined probability density function determined as a product of the individual probability density functions.

A concentrated probability mass has the effect that the physical location 140 of the target 121 might be determined more accurately, and also importantly, the likelihood that the target 121 is located within a designated area can be determined with better confidence.

FIG. 2

Figure 2A:
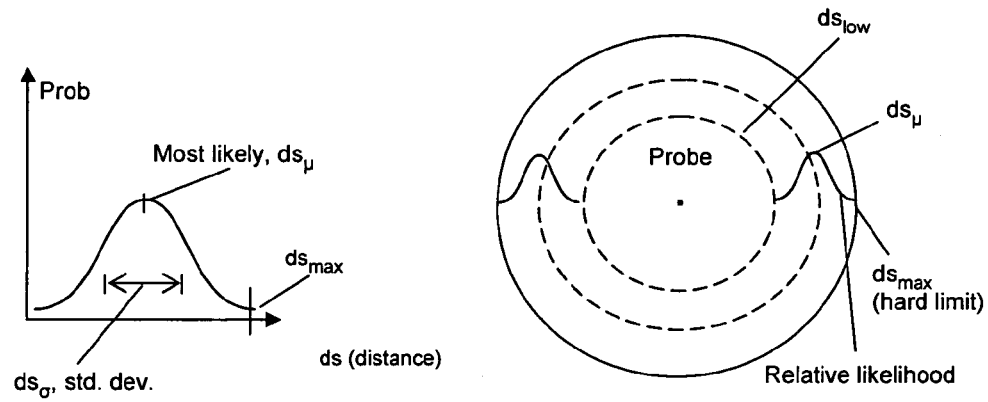
FIG. 2A is a chart and schematic depiction of probability density as a function of distance for a single probe.
Figure 2B:
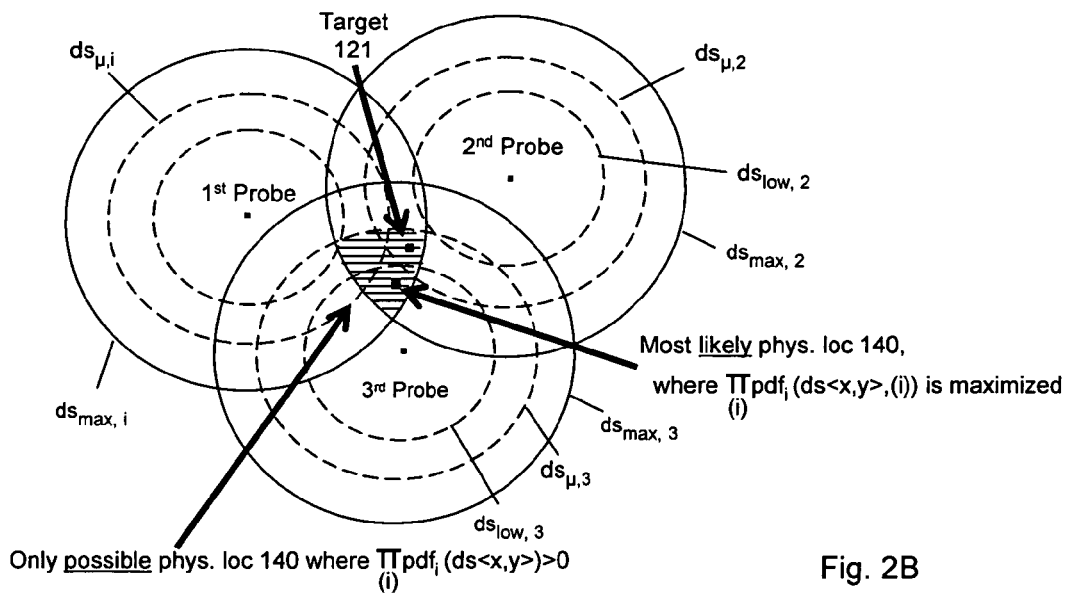
FIG. 2B is a schematic depiction of probability density as a function of distance for a set of multiple probes.
Figure 2C:
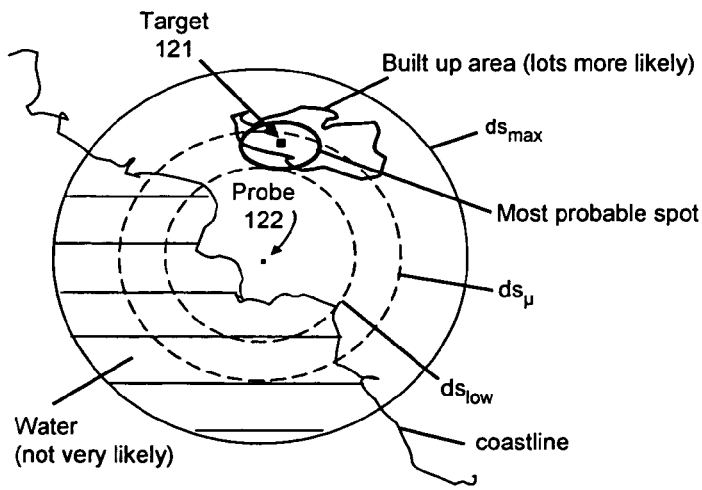
FIG. 2C is a schematic depiction of probability density as a function of location for a probe.

FIG. 2 (including FIG. 2A, FIG. 2B, and FIG. 2C) includes three conceptual drawings of probability density functions of distance. FIG. 2A shows a probability density function of distance for a single probe 122. FIG. 2B shows a probability density function of distance for a set of multiple probes 122. FIG. 2C shows a probability density function of location for a probe 122 and in response to other information.

In the case of a single probe 122, there should be a maximal hump at a mean distance $dt_\mu$, a $1^{st}$ drop-off toward ds=0, and a $2^{nd}$ drop-off toward ds=∞. One description of this shape might be that of a donut or a bundt cake.

Multiple Probes

In the case of a set of multiple probes 122, each possible location is associated with a probability density equal to the product of the separate probability densities derived from each probe 122. Each such probability density function might (and likely will) have a distinct mean distance $ds_{\mu,i}$ and a distinct minimum distance $ds_{low,i}$. As the total for each probability density function equals 100% (the target 121 has to be somewhere), the product of those probability density functions associates, for each possible location, a relative likelihood of the target 121 being there.

$$\text{prob}_{(s=<<x,y>>)}=\Pi_{(i)}\text{pdf}_i(ds_{<<x,y>>,probe_i}), \text{ where}$$

prob(•) is a combined probability density function, and s=<<x,y>> is a particular location.

As the total relative likelihood might be less than one, $$\int_{(<<x,y>>)}\text{prob}_{(s=<<x,y>>)}dx<<x,y>>=p_{relative},$$

the actually associated probability should be adjusted by a factor of $1/p_{relative}$. As the probability density function associated with measurements from probe i, $m_i$ will be zero for places impossible for the target 121 to be located, the product over all such $\text{pdf}_i(•)$ will also be zero for any place deemed impossible by any one or more probes 122.

Domain Information

The statistical likelihood determined as described with respect to the FIG. 2 might be further improved by using secondary probability distribution functions which are also associated with likelihood of the presence (or absence) of the target 121, which secondary probability distribution functions are obtained from other than flight-time measurements.

For example and without limitation, the system 100 might be configured to deem it unlikely that the target 121 is located underwater or at sea, as it is more common for Internet nodes to be located in land-based data centers. More generally, the system 100 might determine a secondary probability distribution function which associates the likelihood of the target 121 being in any particular location <<x,y>>, independently of measurements of flight-time. The following possibilities are intended to be exemplary, not exhaustive:

As noted herein, the system 100 might construct a secondary probability distribution function in response to physical terrain. Physical terrain should be an indicator of how many targets 121 are likely to be located in any particular area at a selected time, as physical terrain often places constraints on the possibility of placing, powering, and accessing, a target 121. Physical terrain might be assigned relative likelihoods for each type of terrain, such as for example, with water areas being associated with relatively low likelihoods, except possibly for known sea lanes where ships travel; with mountainous areas being associated with relatively low likelihoods, except possibly for known landmarks, observatories, roads, and otherwise; with cities and other built-up areas being associated with relatively high likelihoods, except possibly for parks and other oases of the urban jungle. Similarly, zoning requirements might be used as well as physical terrain, with areas zoned for industry or offices having relatively higher likelihood than areas zones for farming or parks.

The system 100 might construct a secondary probability distribution function in response to population density. Population density should be an indicator of how many persons are located in any particular area at a selected time, and (presuming that targets 121 are likely to be located where their users are located) thus might be a proxy for likelihood of any particular target 121 being located in any particular location. Population density might be obtained from census data (as presented in census tract data), from postal code data (as presented by relative geographic size of any particular postal code, presuming that postal codes are allocated in such manner as to pairwise balance traffic between any two selected postal codes), from telephone area code data or exchange data (as presented by relative geographic size of service areas for those telephone area codes or exchanges, presuming that area codes and exchanges are allocated in such manner as to pairwise balance traffic between any two selected area codes or any two selected exchanges), otherwise, or some combination or conjunction thereof.

The system 100 might construct a secondary probability distribution function in response to economic activity. Economic activity should be an indicator of how many computing devices are located in in any particular area at a selected time, and (presuming that targets 121 are likely to be located where computing devices are located) thus might be a proxy for likelihood of any particular target 121 being located in any particular location. Economic activity might be obtained from census data (as presented in census tract data for median income, or otherwise) and other indicators of population density, from power usage (as might be obtained from power usage distribution maps used by a utility), from known economic centers (such as for example cities, their financial districts, their industrial districts, and otherwise), from measures of luminescence at night (such as for example obtained in response to aircraft or satellite photography), otherwise, or some combination or conjunction thereof.

The system 100 might construct a secondary probability distribution function in response to communication bandwidth or other measures of communication capability, such as for example, location of cellular base stations (for cellular communication), location of central offices and telephone switching centers (for wireline communication), communication services offered in particular areas (such as whether there is cable access, whether there is IEEE 802.11 "wi-fi" access, whether there is DSL access) and to what level of service those communication services are available.

The system 100 might construct a secondary probability distribution function in response to any other information associated with likelihood of any particular target 121 being physically in a particular area or at a particular spot, such as for example location of a college campus or enterprise campus within a city or town, or location of particular buildings within a college campus or enterprise campus.

As noted with reference to the FIG. 2B, one or more primary probability distribution functions might be combined with one or more secondary probability distribution functions, similarly to the multiplicative combination described with reference to the FIG. 2B. As noted with reference to FIG. 2B, a multiplicative combination preserves findings that a particular target 121 cannot be located in an identified region, and might involve renormalization if the integral of the multiplied probability distribution functions sums to less than 100%.

As noted herein, the secondary probability distribution functions might be substantially continuous in nature, ranging over a set of values from point to point, might be substantially discrete in natures, such as having discontinuous revaluations at city and country borders, or some combination or conjunction thereof.

FIG. 3

Figure 3:
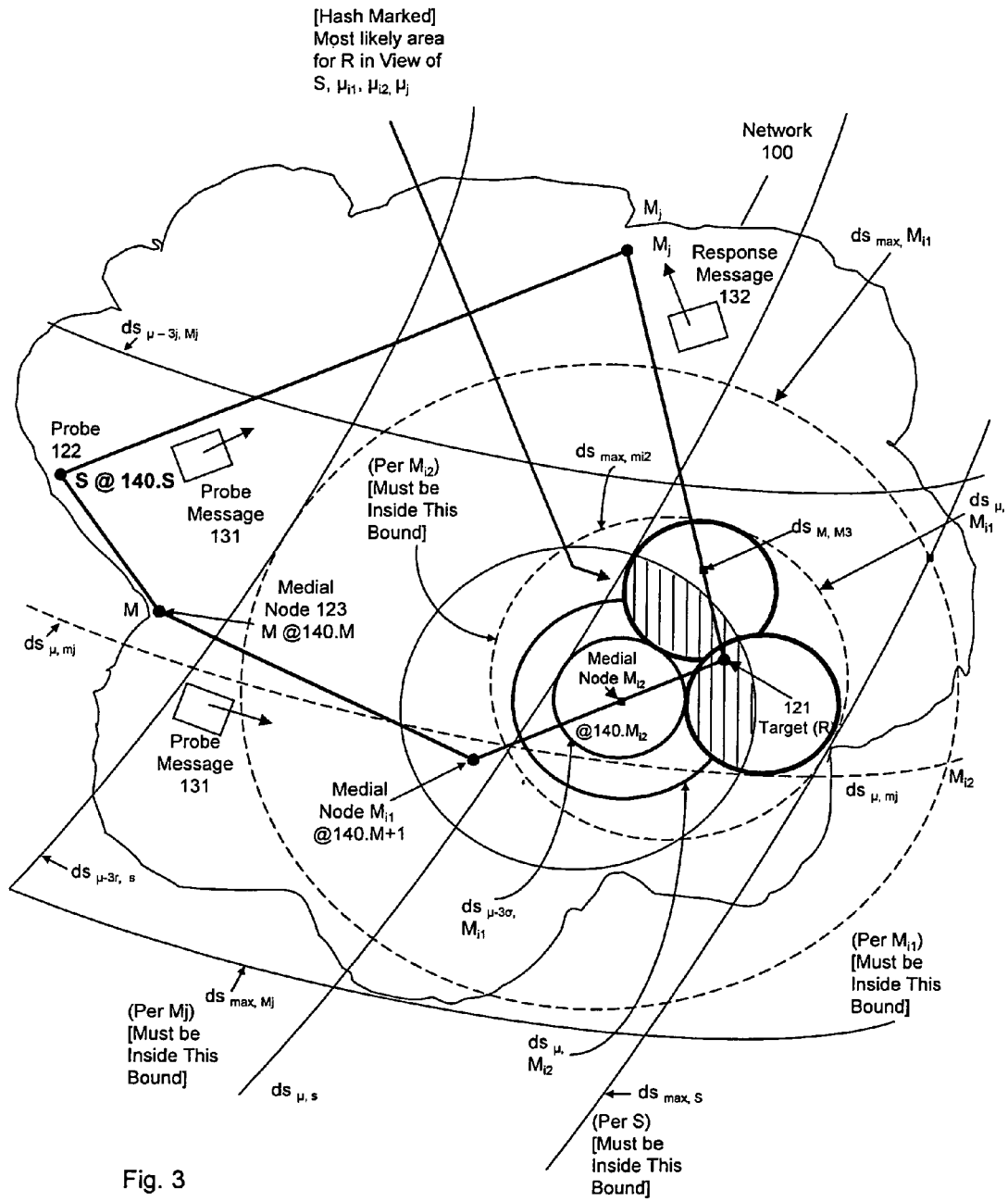
FIG. 3 is a schematic depiction of a geolocation system pursuant to the invention in the location of intermediate nodes between a probe and a target.

FIG. 3 shows a conceptual drawing of locating intermediate nodes 123 M between a particular probe 122 S and a particular target 121 R, and of further restricting the scope of likely physical locations 140 for any particular target 121 in response thereto.

The FIG. 3 shows a network 100, including one or more probes 122 and one or more targets 121, and including one or more medial nodes 123 M through which messages, such as for example one or more probe messages 131 or one or more response messages 132, are routed or switched. In one embodiment, an Internet "traceroute" utility, a router monitoring system (such as RMON), information from one or more routers' link-state tables, otherwise, or some combination or conjunction thereof, might provide information describing a sequence of those one or more medial nodes 123 M through which probe messages 131 and response messages 132 are routed or switched.

In cases in which the system 100 can identify those one or more medial nodes 123 M, and can also determine the physical location 140 for one or more of those medial nodes 123 M, the system 100 might treat each medial node 123 M for which it can identify a physical location 140 (even if only probabilistically) as a proxy for the probe 122. This has the effect that the system 100 might be able to provide a primary probability distribution function in response to flight-time measurements from the medial node 123 M, in addition to, or in lieu of, flight-time measurements from the probe 122 S.

Example Medial Node

For example and without limitation, if the target 121 is determined to be located, for just one example, definitely at least 300 kilometers from the probe 122 and most likely about 500 kilometers from the probe 122, the primary probability distribution function in response thereto provides information with respect to the physical location 140 of the target 121. If, for just one example, there is a medial node 123 $M_1$ through which the probe message 131 and the response message 132 are known to be propagated, and that medial node 123 $M_1$ is known to be present at a particular physical location 140 <<x,y>>$_m$, and the flight-time time between that medial node 123 $M_1$ and the target 121 indicate that the target 121 is definitely at least 1 kilometer from that medial node 123 $M_1$, and most likely about 2 kilometers from that medial node 123 $M_1$, the system 100 can provide a more restricted primary probability distribution function in response to measured flight-time from the medial node 123 $M_1$.

This more restricted M-to-R probability distribution function should fit substantially within the S-to-R probability distribution function.

Multiple Medial Nodes and Multiple Network Paths

This process might be iterated, so long as the system 100 can find further medial nodes $M_i$ that provide more information about the physical location 140 of the target 121. In a $1^{st}$ example, each further medial node 123 $M_i$ should be closer to the target 121, information about those further medial nodes 123 $M_i$ being possibly obtained from further traceroute operations, or otherwise. In a $2^{nd}$ example, more than one medial node 123 $M_i$, $M_j$ might be used to determine information describing the physical location 140 of the target 121, with the $M_i$-to-R probability distribution function being combined with the $M_j$-to-R probability distribution function for possible better accuracy or precision.

Similarly, this process might be performed in parallel, so long as the system 100 can find further nodes, whether probes 122 or medial nodes 123, that individually or collectively provide more information about the physical location 140 of the target 121. In a $1^{st}$ example, a system 100 might include more than one such probe 122, each operating in response to instructions from a defined collection device 124 (which might itself also perform as a probe 122). From multiple such probes 122, flight-time distances from such probes 122 to the target 121 might be determined, probability distribution functions for the physical location 140 of the target 121 might be determined, and those probability distribution functions combined. From multiple such network pathways, each pairwise between one such probe 122 and the target 121, one or more medial nodes 123 might be determined, flight-time distances from such medial nodes 123 to the target 121 might be determined, more restrictive probability distribution functions for the physical location 140 of the target 121 might be determined, and those probability distribution functions combined.

Probabilistic Geolocation

As described above, a set of information relating to a probabilistic conclusion might be expressed in a formula or table $s_{prob}\{\bullet\}$, having parameters $dt_{flight}$, hop-count, probability-value, and providing in response thereto a most likely position s, or a most likely distance ds from the probe 122. For example and without limitation $s_{prob}\{30$ milliseconds, 6 hops, 66% chance$\}$ might provide a most likely distance such as ds=450 kilometers.

In one embodiment, an entire subnet (including any arbitrary set of coupled nodes, not necessarily an IP subnet) might be geolocated. The system 100 might geolocate a selected set of nodes, such as a set of representative nodes, within that subnet, or might geolocate a sufficient set of nodes, such as a sufficient number of such nodes, within that subnet, with the effect that the system 100 would be able to determine a density distribution for that subnet (such as for example a probability density distribution or a histogram of density for selected physical regions spanned by that subnet). In alternative embodiments, the system 100 might geolocate boundaries of that subnet, such as for example by geolocating each boundary node, although knowledge of a set of such (network topological) boundary nodes might not provide adequate information about a set of geographic boundaries of that subnet. This has the effect that the system 100 might provide an approximate (physical) perimeter of a set of nodes, with which the system 100 might provide a likelihood that a target 121 is within that subnet.

Countermeasures Against Uncooperative Devices.

Although this description is primarily directed to cases in which the target device is willing and able to cooperate with the geolocation system, in the context of the invention, there is no particular reason for any such limitation. For example and without limitation, if the target refuses to respond to geolocation signals from the probe, or if the target responds in such way that geolocation would be misdetermined, the probe might take countermeasures to obviate problems introduced by uncooperative targets.

Refusing to Respond to Geolocation Signal.

If the target refuses to respond, or is prevented from responding by a firewall device or another cause, to a $1^{st}$ type of geolocation signal, the probe might attempt to coax a response from the target using a $2^{nd}$ type of geolocation signal. For example, and without limitation, the probe might use a $1^{st}$ type of geolocation signal including a Ping request. If the target does not respond to a Ping request, the probe might use a $2^{nd}$ type of geolocation signal including an unsolicited HTTP reply (not request). Likely, the any firewall will allow this $2^{nd}$ type of geolocation signal to reach the target, which will make an error response.

While it is possible that the target might refuse to respond, or be prevented from responding, to a Ping request, the probe might use a $2^{nd}$ type of geolocation signal including an unsolicited HTTP reply message, in response to the assumption that security policies are more likely to allow HTTP traffic to traverse the firewall unimpeded.

An unsolicited HTTP reply will normally be determined by the target to be a result of a protocol error, with the effect that the target will normally respond with an error message. In response to the assumption that this error message will be generated without substantial processing, the error message has the effect of providing a response that is similar in usefulness in geolocation as an echo response to a Ping request.

Similarly, if the target does not respond to a $2^{nd}$ type of geolocation signal including an unsolicited HTTP reply, the probe might attempt to reach the target with a $3^{rd}$ type of geolocation signal, a $4^{th}$ type of geolocation signal, and the like.

If the target does not respond to any geolocation signal from the probe, the probe might attempt to geolocate a firewall protecting the target, in response to an assumption that the firewall is operated by the same entity as the target, and is substantially co-located with the target. While geolocation of the firewall might not provide an exact location for the target, the firewall's location might serve as a sufficient proxy for the target's location.

Similarly, if the firewall refuses to respond, or is prevented from responding by a security policy or another cause, the probe might attempt to coax a response from the firewall, similarly to coaxing a response from the target. If the firewall does not respond to any geolocation signal from the probe, the probe might attempt to geolocate a nearest-neighbor in the communication network, an identifiable router near the firewall, or use some other proxy for the target's or the firewall's location.

Attempting to Spoof the Response.

If the target attempts to fool the probe, such as if the target deliberately delays its response to the probe (making the target seem farther than it really is), or if the target deliberately attempts to anticipate its response to the probe (making the target seem closer than it really is), the probe might require authentication of the target's response to the geolocation signal.

If the target deliberately delays its response, this also has the effect of generally degrading the target's availability in the communication network. While the target might be willing to pay this price in exchange for being difficult to geolocate, the probe can make it difficult for the target to pay this price only for geolocation signals. If it is known (or even suspected with sufficient reliability) what types of traffic the target is expecting to receive and to respond to, the probe might send those specific types of traffic to the target as a form of geolocation signal. This would have the effect that the target would find it difficult to discern geolocation signals from traffic the target was expecting to receive and to respond to.

In alternative embodiments, the probe might use both a $1^{st}$ type of geolocation signal and a $2^{nd}$ type of geolocation signal, mixed randomly or pseudo-randomly, so that the target cannot easily determine which type of signal should be delayed. One or more of the $1^{st}$ type of geolocation signal and the $2^{nd}$ type of geolocation signal might be types of traffic the probe suspects the target is expecting to receive and to respond to. The target would be unable to select only geolocation signals for delayed response, with the the effect that the target would be unable to mitigate the cost it pays for being difficult to geolocate. In cases where the probe does not know (or does not know with sufficient certitude) what type(s) of traffic the target is expecting to receive and to respond to, the probe might send a variety of geolocation signals of distinct types, with the effect that at least some of those geolocation signals would be type(s) of traffic the target is expecting to receive and to respond to.

It is more easily obviated if the target attempts to anticipate its response to the probe. In such cases, the probe might include a random or pseudo-random authentication string in its geolocation signal, or direct its geolocation signal to a random or pseudo-random port number at the target, with the effect that the target would have insufficient information to provide an authenticated response to the probe until the target actually receives the geolocation signal from the probe.

ALTERNATIVE EMBODIMENTS

The invention has applicability and generality to other aspects of network control, management, and reporting, including at least

- substantial applicability in combination with or in conjunction with network management in a communication network including moving devices;
- substantial applicability in error-checking of routing techniques for use in a communication network;
- substantial applicability in identifying geographic (or temporal) coincidences, particularly those coincidences which are otherwise unexpected, such as for example correlation between two or more otherwise seemingly-unrelated conditions, events, nodes, or problems, which might be related due (in whole or in part) from their geographic coincidence; and
- substantial applicability in identifying (preferably relatively quickly) those geographic portions of a network that are debilitated, degraded, or otherwise influenced by an problem or other unusual condition;
- substantial applicability with diagnostics and with troubleshooting techniques used in conjunction with a communication network, or with a distributed system; and
- other and further similar techniques, as well as combinations and conjunctions thereof.

The invention claimed is:

1. A method, including steps of sending a signal from a $1^{st}$ device in a network to a target;

measuring a flight time delay in the network in response to the signal;

determining, based on the flight time delay, $1^{st}$ information comprising a maximum possible distance of said target relative to said $1^{st}$ device, a most likely distance of said target relative to said $1^{st}$ device, and a probabilistic distribution of most likely distances of said target relative to said $1^{st}$ device, with the probabilistic distribution having a value of substantially zero probability at locations beyond the maximum possible distance;

combining said $1^{st}$ information with $2^{nd}$ information wherein the $2^{nd}$ information comprises a probabilistic component based on location within a geographic region wherein the probabilistic component is responsive to at least one of the group consisting of physical terrain, population density, and communication bandwidth; and establishing a measure of confidence of the target being in one or more identified geographic regions of elevated confidence based on the $1^{st}$ information in combination with the $2^{nd}$ information regarding the one or more geographic regions of elevated confidence and establishing a measure of confidence of the target not being in one or more identified geographic regions of reduced confidence based on the $1^{st}$ information in combination with the $2^{nd}$ information regarding the one or more geographic regions of reduced confidence.

2. The method of claim 1, wherein said signal is responsive to a protocol used in said network.

3. The method of claim 1, wherein the step of measuring includes receiving a $2^{nd}$ signal responsive to an action by said $1^{st}$ device.

4. The method of claim 1, wherein the step of measuring includes receiving a $2^{nd}$ signal from said target.

5. The method of claim 1, wherein the step of measuring is responsive to a time duration between sending the signal from the $1^{st}$ device and receiving a signal from the target.

6. The method of claim 5, wherein said time duration is responsive to a distance to said target.

7. The method of claim 5, wherein said time duration is responsive to a communication with said target.

8. The method of claim 5, wherein said time duration is responsive to a processing time by one or more devices in said network.

9. The method of claim 8, wherein said one or more devices include said target.

10. The method of claim 8, wherein said one or more devices include one or more devices other than said target.

11. The method of claim 1, wherein the $2^{nd}$ information is interpretable by a computing device to identify a geographic region of reduced confidence where said target substantially cannot be found based on one or more of physical terrain, population density, and communication bandwidth.

12. The method of claim 1, further comprising the step of identifying an attribute of the target comprising specifying one or more of a measure of bandwidth, a measure of network connectivity, a probability of a designated use, or a probability of authentication, associated with said target.

13. A method for providing information regarding a physical location of a target, the method including steps of
sending a signal from a $1^{st}$ device in a network to the target;
measuring a flight time delay in the network in response to the signal;
determining, based on the flight time delay, $1^{st}$ information associated with the physical location of said target;
identifying a medial node based on the $1^{st}$ information associated with the physical location of the target;
detecting a medial node processing delay in said network in response to a signal between the medial node and the target;
determining, in response to the medial node processing delay, information associated with the physical location of the target more precise than the $1^{st}$ information associated with the physical location of the target by subtracting the medial node processing delay from the flight time delay; and
combining the $1^{st}$ information with $2^{nd}$ information wherein the $2^{nd}$ information comprises a probabilistic component based on location within a geographic region wherein the probabilistic component is responsive to at least one of the group consisting of physical terrain, population density, and communication bandwidth and establishing a measure of confidence of the target being in one or more identified geographic regions of elevated confidence based on the $1^{st}$ information in combination with the $2^{nd}$ information regarding the one or more geographic regions of elevated confidence and establishing a measure of confidence of the target not being in one or more identified geographic regions of reduced confidence based on the $1^{st}$ information in combination with the $2^{nd}$ information regarding the one or more geographic regions of reduced confidence.

14. The method of claim 1 or 13, wherein at least one of said $1^{st}$ information or said $2^{nd}$ information is responsive to a substantially continuous probability density function.

15. The method of claim 14, wherein said function decreases from a location having a maximum value to locations indicating a closer distance to said target.

16. The method of claim 14, wherein said function decreases from a location having a maximum value to locations indicating a farther distance to said target.

17. The method of claim 14, wherein said function decreases from a location having a maximum value to locations indicating a closer distance to a medial device said medial device being disposed on a communication path including said target.

18. The method of claim 14, wherein said function decreases from a location having a maximum value to locations indicating a farther distance to a medial device said medial device being disposed on a communication path including said target.

19. The method of claim 1 or 13, wherein the population density is responsive to a density function, said density function having one or more regions interpretable by a computing device as substantially zero density.

20. The method of claim 1 or 13, wherein the $2^{nd}$ information is interpretable by a computing device to identify an area of a surface or a region in a space.

21. The method of claim 20, wherein said area of a surface or region in a space includes one or more of a defined surface of possible locations, a defined volume of possible locations, a terrain surface, an at least partially built-up area, an underground environment, or an underwater environment.

22. The method of claim 1 or 13, wherein said $2^{nd}$ information is responsive to domain knowledge about said target originating from one or more devices other than said target.

23. The method of claim 22, wherein said $2^{nd}$ information is responsive to one or more of, a measure of density of cellular base stations, a measure of distance from a cellular base station, a measure of economic development, a measure of night luminescence, or a measure of population or population density.

24. The method of claim 22, wherein said $2^{nd}$ information is responsive to one or more of census data, or land-use data.

25. The method of claim 22, wherein said $2^{nd}$ information is responsive to one or more bodies of water or topographic boundaries.

26. The method of claim 1 or 13, wherein the $2^{nd}$ information comprises a product of multiplying a first probabilistic component by a second probabilistic component.

27. The method of claim 13, wherein said steps of identifying include steps of specifying one or more of, a probabilistic distribution of locations, a probabilistic distribution of nearest-neighbors, a set of locations where said target substantially cannot be found, a set of physically nearest-neighbors in said network or in a $2^{nd}$ network, a set of topologically nearest-neighbors in said network or in a $2^{nd}$ network, or an integral of at least a portion of a probabilistic distribution, associated with said target.

28. A method for determining a most likely location s of a target in relation to a probe, the method comprising the following steps:
sending a signal from a probe in a network to the target along a path;

measuring a flight time delay $dt_{flight}$ in the network in response to the signal;

determining a probabilistic conclusion regarding the likely location s of the target based on the formula $S_{prob}\{\bullet\}$ having parameters comprising the measured flight time delay $dt_{flight}$, a routing parameter comprising a hop-count, processing delays of known medial nodes within the path, and a probabilistic component responsive to at least one component from the group consisting of physical terrain, population density, and communication bandwidth;

establishing a measure of confidence of the target being in one or more identified geographic regions of elevated confidence based on the $1^{st}$ information in combination with the $2^{nd}$ information regarding the one or more geographic regions of elevated confidence and establishing a measure of confidence of the target not being in one or more identified geographic regions of reduced confidence based on the $1^{st}$ information in combination with the $2^{nd}$ information regarding the one or more geographic regions of reduced confidence; and providing in response to the formula $S_{prob}\{\bullet\}$ a most likely location s of the target.

\* \* \* \* \*